United States Patent [19]

Selfe

[11] 4,041,997
[45] Aug. 16, 1977

[54] ROUTING APPARATUS

[76] Inventor: Barry David Selfe, "Fourays", Seamans Green, Capel, Surrey, England

[21] Appl. No.: 550,050

[22] Filed: Feb. 14, 1975

[30] Foreign Application Priority Data

Feb. 14, 1974 United Kingdom ............... 6861/74

[51] Int. Cl.² .............................................. B27C 5/10
[52] U.S. Cl. ................................. 144/136 C; 30/293; 90/12 D
[58] Field of Search .................... 30/500, 293; 51/102, 51/170 PT; 90/12 D, 12 R; 144/82, 83, 134 R, 134 A, 134 D, 136 R, 136 C, 253 D, 253 J, 253 G

[56] References Cited

U.S. PATENT DOCUMENTS

| 2,771,104 | 11/1956 | Saxe | 144/136 C X |
| 2,935,102 | 5/1960 | Potter | 144/136 C X |
| 3,274,889 | 9/1966 | Ferris | 30/293 X |
| 3,494,394 | 2/1970 | Stock | 144/136 C X |

FOREIGN PATENT DOCUMENTS

| 603,858 | 1/1926 | France | 144/136 C |
| 954,737 | 12/1956 | Germany | 144/134 D |

Primary Examiner—Gary L. Smith
Attorney, Agent, or Firm—Wenderoth, Lind & Ponack

[57] ABSTRACT

Routing apparatus comprising a frame which at one end is connected, or adapted for connection, with electric motor drive means. The frame at its other end has an arm which provides a location for a bearing defining with the drive means the axis of rotation of a shaft having a routing cutter thereon. The arm has side faces which lie in respective planes which extend parallel to the axis of rotation and have an included angle of 90° or less, and at least that part of the frame adjacent the arm and the routing cutter is confined between the respective planes.

10 Claims, 4 Drawing Figures

U.S. Patent   Aug. 16, 1977   Sheet 1 of 2   4,041,997
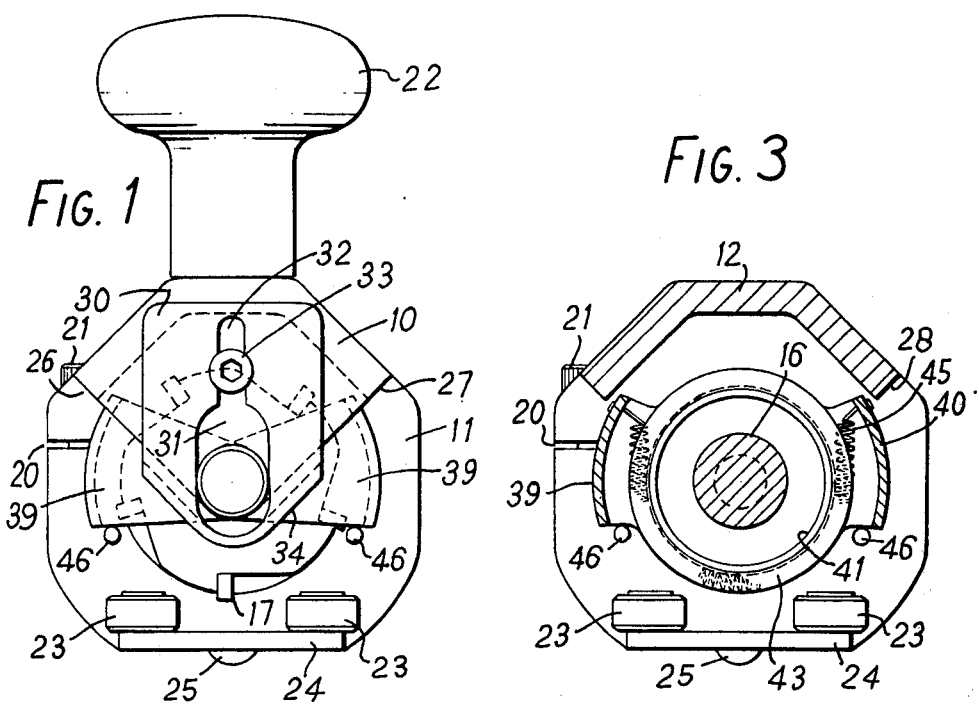
Fig. 1
Fig. 3
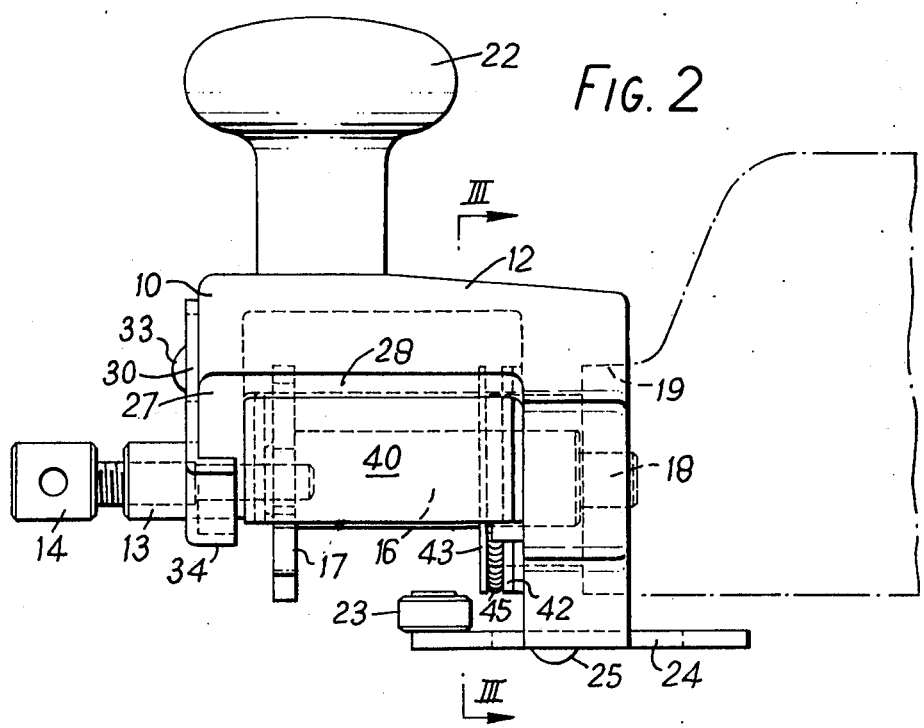
Fig. 2

ROUTING APPARATUS

This invention relates to routing apparatus of the type employing a circular routing cutter, and which may include or may be adapted to be attached, to, an electric motor.

The apparatus of the inventon is particularly, but not exclusively, useful for forming, cleaning out, or enlarging grooves in window frames or other structures having internal corners.

In order to support a cutter adequately and to provide satisfactory control during routing or grooving, it is necessary to mount the cutter on a shaft in an apparatus with bearings on each side of the cutter. Hitherto such an arrangement has made it difficult to continue routing or grooving into an internal corner of a structure such as a window frame because, during work on one part of the structure, the framework of the apparatus which connects the bearing is obstructed by another part of the structure.

It is now proposed to overcome this difficulty by providing such a routing apparatus wherein the cutter can cut into the corner formed by mutually perpendicular faces of a work piece to its maximum cutting depth without interference of its framework with either face.

According to the invention there is provided routing apparatus comprising a frame which at one end is connected, or adapted for connection, with electric motor drive means wherein the other end of the frame has an arm providing location for a bearing defining with the drive means the axis of rotation of a shaft having a routing cutter thereon, the arm has side faces that lie in respective planes which extend parallel to the said axis and have an included angle of 90° or less, and at least part of the frame adjacent the arm is confined between the respective planes.

This apparatus allows the cutter to cut right into the corners of, for instance, window frames, leaving only a minimum of squaring off to be performed.

The depth of cut will normally be limited by an arcuate surface formed or provided on the arm and which acts as a depth stop. In the region of the cutter, the frame of the apparatus should not extend out of the space bounded by the two planes which are preferably tangential to the arcuate surface. While the angle between such planes should not exceed 90° it may be made smaller for example 60°, without affecting the operation of the apparatus.

If the apparatus of the invention is integral with the housing of an electric motor it will itself include two shaft bearings, or it may have only a single shaft bearing with the free end of the shaft then being adapted to be connected with a motor to which the frame may be clamped so that second bearing is a motor bearing. The apparatus is conveniently arranged for attachment to an electric drill of commercially available type, and in such a case the frame can be clamped onto the body of the drill, the shaft being screwed into the drill shaft in place of the normal chuck.

The cutter may be detachable from the shaft, but it may be preferred to have a plurality of different cutters each permanently associated with a particular shaft for ease of replacement and exchange. Thus, the apparatus of the invention may include simply a frame as defined above to allow cutting of adjacent perpendicular surfaces of a work piece with at least one bearing to receive an end of a cutter supporting shaft, which frame can be attached to or includes a motor to which the other end of the shaft is connected.

A handle may be provided on the frame and there may be an adjustable stop to control the distance of cut from an edge of the workpiece. Such stop is preferably in the form of rollers to engage and roll on the edge of a work piece.

A selection of removable depth stops may be provided which are securable on the arcuate surface or the arm may be provided with an adjustable depth stop.

In order that the invention may be more clearly understood, the following description is given merely by way of example, with reference to the accompanying drawings, in which:

FIG. 1 is an end view of one form of routing apparatus according to the invention;

FIG. 2 is a side view of the apparatus of FIG. 1;

FIG. 3 is a section on the line III — III in FIG. 2; and

Figure 4:
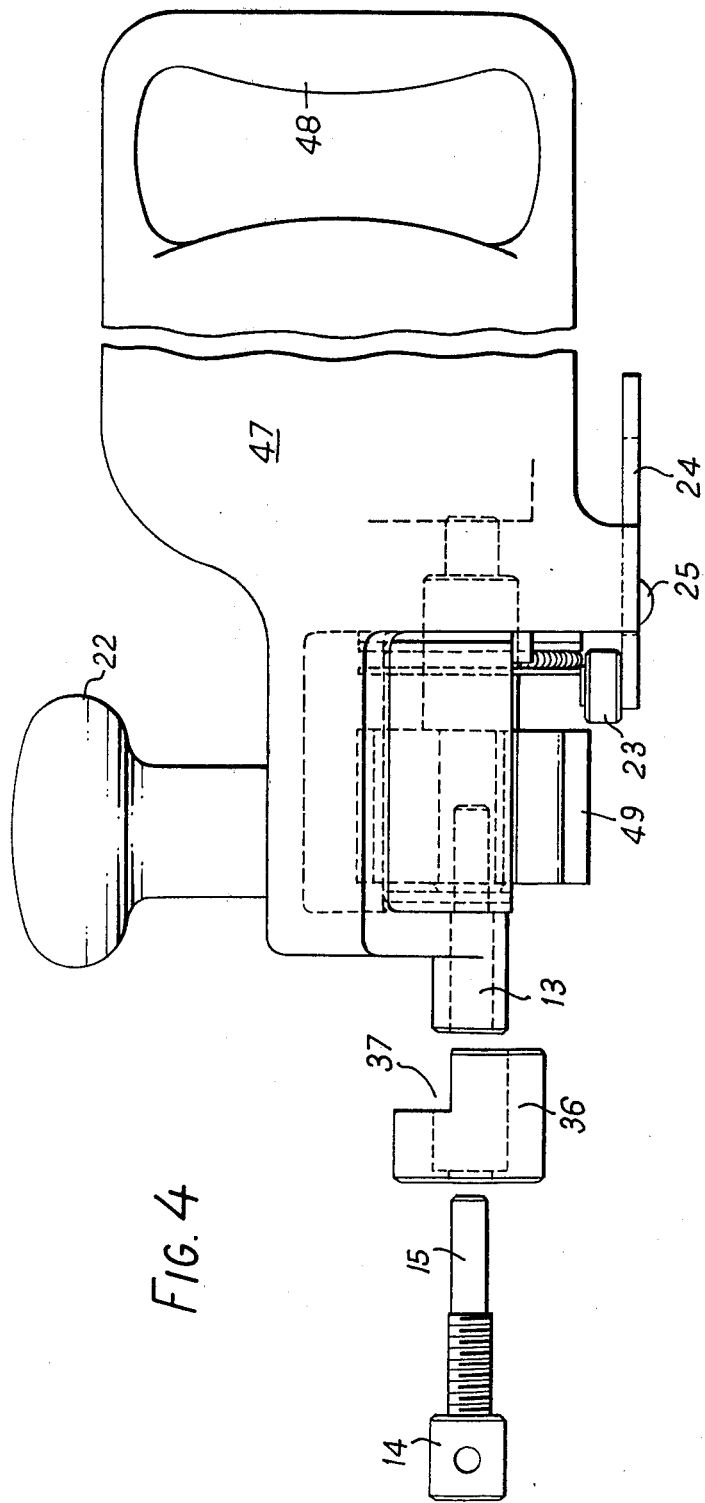
FIG. 4 is a side view of the apparatus incorporated with an electric motor.

The apparatus shown in the drawings has a frame having at its outer end an arm 10 and at its inner end a flange 11. The arm 10 is formed with a boss 13 having a threaded bore in which a threaded pin 14 is engaged. The end 15 of the pin (FIG. 4) which is not threaded is hardened and engages in a tubular bearing bushing located in the end of a shaft 16 to form a bearing therefore. A routing cutter 17 is shown mounted on the shaft. The shaft is provided at the end remote from the bearing with a portion 18 of reduced diameter which is formed with a screw thread, and extends through an aperture 19 in the flange 11. The aperture 19 is of a size suitable to engage on the nose of an electric drill, indicated by chain dotted lines in FIG. 2, and the flange 11 is slotted at 20 and can, by means of a bolt 21 be firmly clamped to the drill. At the top of the frame 12, above the cutter, is a handle 22.

A pair of rollers 23 are mounted on an adjustable support 24 at the bottom of flange 11. The support can be clamped in a selected longitudinal position by a set screw 25.

It will be seen that the arm 10 is substantially segmental, being defined between side faces 26 and 27, which lie in planes which are perpendicular, parallel to the axis of the shaft 16, and tangential to the boss 13. The frame 12 has side faces 28 which are coplanar with faces 26 and 27.

It will be readily apparent that the boss 13 defines the maximum possible depth of cut of the cutter 17.

To provide for adjustment of cutting depth two alternative arrangements are provided. In the first arrangement illustrated in FIGS. 1, 2 and 3 the outer face of the arm 10 is provided with a plate 30 which is slotted at 31 to receive the boss 13 and formed with a narrow slot 32 to receive the shank of a set screw 33. The lower edge of the plate is formed with a turned over lip 34 which lies, in the upper most position of the plate, contiguous with the side faces 26 and 27 of the arm 10 and the arcuate lower end portion of the arm 10 and boss 13. By lowering the plate 30 and locking it in position by means of the set screw 33 the depth of cut may be reduced to a desired value. In the second arrangement which is illustrated in FIG. 4 there is provided a range of sleeves of selected diameters, one of which is shown at 36, which fit over the boss 13 and the arcuate end of the arm 10. The sleeve is cut away at 37 so that it also fits against the side faces 26 and 27 of the arm and is provided with a bore to pass the pin 14. This arrangement thus provides for cutting depth of selected dimensions.

In operation of the apparatus, when attached to an electric drill, routing is performed by the cutter at a distance from the edge of the work piece governed by the position of the rollers 23. When the apparatus approaches an internal right angled corner, the arm 10 will be obstructed by that part of the work piece which lies at right angles to the part already routed. At this point, the apparatus can be rotated so that, for instance, face 26 lies on that part already routed. This will allow the cutter to cut right into the corner at its selected cutting depth, and simultaneously to start the groove in the adjacent perpendicular part again to the selected depth.

When routing is initiated, that end of face 26 or 27 which is remote from the boss 13 can be laid on the surface and the apparatus rotated so that the initial penetration of the cutter into the work piece can be carefully controlled.

Clearly the perpendicular arrangement of faces 26 and 27 will be satisfactory for most purposes, but the faces could be arranged at a lesser angle if desired, for instance for cutting an acute angled frame.

The apparatus is provided with two cutter guards 39 and 40 (FIG. 3) which cover during operation the exposed parts of the cutter. Each guard consists of an arcuate portion which extend between the arm 10 and flange 11 and is formed at each end with a radially extending limb. At the end adjacent the arm 10 this limb is formed with an aperture through which the end 15 of pin 14 passes. At the other end the limb is formed with a large aperture which seats on a sleeve 41. This sleeve is loosely retained within a reduced diameter portion of the aperture 19 in the flange 11 and is formed with two spaced flanges 42 and 43. Flange 43 serves to retain the limbs of the guards 39 and 40 between the flange 43 and the adjacent face of flange 11 while the space between flanges 42 and 43 locates a spiral spring 45 the ends of which are connected with the guards and which biases the guards downwards to the position shown where they engage stops 46.

The combination of an electric drill and the routing apparatus of this invention illustrated in FIG. 2 has two handles for accurate control and has two bearings for adequate support of shaft 16 and cutter accuracy, one of the bearings being in the drill.

FIG. 4 is a side view of an embodiment of the apparatus of this invention incorporating an electric motor 47. In this case, as compared with the preceding embodiment, the flange 11 is integral with the motor housing. The motor, of course provides the second bearing for the shaft 16 and a second handle 48 is provided for ease of use. The guide rollers 23 are again provided.

The embodiment shown in FIG. 4 illustrates the use of a cutter 49, which is of greater axial length. The length may be 1 inch and the diameter 1½ inches. Such a cutter is particularly adapted for routing old putty, glass and nails from window frames prior to reglazing.

The cutter for use in the apparatus of this invention may be formed integrally with the shaft 16 or may be made separately and brazed or welded to the shaft. In either case they may be provided with cutting teeth formed of hard metal in known manner.

Conveniently a set of cutters of differing axial lengths may be provided and a change of cutter is readily effected since it is merely necessary to remove the pin 14 when the cutter and shaft can be removed after the shaft has been disengaged from the shaft of the drive motor.

What I claim is:

1. Routing apparatus comprising a frame having an inner end shaped for connection with the housing of an electric motor having drive means, and an outer end having an integral arm thereon; a shaft having a routing cutter thereon and having one end located in said integral arm and the other end shaped so as to be coupled with said drive means; said arm having side faces that lie in respective planes which extend parallel to the axis of rotation of the shaft and have an included angle of up to and including 90°, and said arm further having at the free outer end thereof an arcuate end face with said planes extending tangentially thereto, the end face acting to define the maximum cutting depth; a boss on the outer face of the arm with a portion of the surface thereof coplanar with said arcuate end face; and at least part of the frame adjacent the arm being confined between the respective planes.

2. Routing apparatus as claimed in claim 1 wherein at least part of the frame adjacent the arm has side faces which lie in the said planes.

3. Routing apparatus as claimed in claim 1 wherein the boss has a threaded bore therein, a threaded pin having a cylindrical hardened end threaded through said bore, said shaft having a bearing bushing in said one end in which said hardened end is received and forming a bearing therefore.

4. Routing apparatus as claimed in claim 1 further including a removable depth control sleeve secured over said boss.

5. Routing apparatus as claimed in claim 1 further including a stop adjustably mounted thereon for movement in the direction of the axis of rotation of said shaft.

6. Routing apparatus as claimed in claim 1 wherein said stop includes at least one roller thereon engagable with the work piece for locating the position of the cutter relative to the thickness of the work piece.

7. Routing apparatus as claimed in claim 1 wherein the said inner end of the frame has a split flange having a circular aperture therethrough, whereby the frame may be clamped onto the end of an electric drill.

8. Routing apparatus comprising a frame having an inner end shaped for connection with the housing of an electric motor having drive means, and an outer end having an integral arm thereon; a shaft having a routing cutter thereon and having one end located in said integral arm and the other end shaped so as to be coupled with the drive means; said arm having side faces that lie in respective planes which extend parallel to the axis of rotation of the shaft and have an included angle of up to and including 90°, and said arm further having at the free outer end thereof an arcuate end face with said planes extending tangentially thereto, at least part of the frame adjacent the arm being confined between the respective planes; and an adjustable depth stop comprising a plate adjustably mounted on the outer face of said arm and having a lip which overlies and is contiguous with the side faces and the arcuate end face of the arm.

9. Routing apparatus comprising a frame having an inner end, an electric motor having drive means and connected to said inner end, said frame having an outer end having an integral arm thereon; a shaft having a routing cutter thereon and having one end located in said integral arm and the other end shaped so as to be coupled with said drive means; said arm having side faces that lie in respective planes which extend parallel to the axis of rotation of the shaft and have an included angle of up to and including 90°, and said arm further having at the free outer end thereof an arcuate end face with said planes extending tangentially thereto, the end face acting to define the maximum cutting depth; a boss on the outer face of the arm with a portion of the surface thereof coplanar with said arcuate end face; and at least part of the frame adjacent the arm being confined between the respective planes.

10. Routing apparatus comprising a frame having an inner end, an electric motor having drive means and connected to said inner end, said frame having an outer end having an integral arm thereon; a shaft having a routing cutter thereon and having one end located in said integral arm and the other end shaped so as to be coupled with the drive means; said arm having side faces that lie in respective planes which extend parallel to the axis of rotation of the shaft and have an included angle of up to and including 90°, and said arm further having at the free outer end thereof an arcuate end face with said planes extending tangentially thereto, at least part of the frame adjacent the arm being confined between the respective planes; and an adjustable depth stop comprising a plate adjustably mounted on the outer face of said arm and having a lip which overlies and is contiguous with the side faces and the arcuate end face of the arm.

* * * * *